United States Patent
Ishikawa et al.

(10) Patent No.: US 10,569,454 B2
(45) Date of Patent: Feb. 25, 2020

(54) METHOD FOR MANUFACTURING IMPELLER

(71) Applicant: HONDA MOTOR CO., LTD., Tokyo (JP)

(72) Inventors: Hiroshi Ishikawa, Tochigi (JP); Shigeto Akahori, Tochigi (JP); Yoshinori Tsurugai, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 15/555,242

(22) PCT Filed: Jan. 13, 2016

(86) PCT No.: PCT/JP2016/050797
§ 371 (c)(1),
(2) Date: Sep. 1, 2017

(87) PCT Pub. No.: WO2016/143372
PCT Pub. Date: Sep. 15, 2016

(65) Prior Publication Data
US 2018/0243955 A1    Aug. 30, 2018

(30) Foreign Application Priority Data
Mar. 6, 2015 (JP) ................. 2015-044509

(51) Int. Cl.
*B29C 45/00* (2006.01)
*F04D 29/28* (2006.01)
*B29L 31/08* (2006.01)

(52) U.S. Cl.
CPC ...... *B29C 45/0053* (2013.01); *B29C 45/0081* (2013.01); *F04D 29/281* (2013.01); *B29L 2031/08* (2013.01)

(58) Field of Classification Search
CPC ............ B29C 45/0053; B29C 45/0081; B29C 45/2624; F04D 29/281; F04D 29/023;
(Continued)

(56) References Cited

U.S. PATENT DOCUMENTS 3,246,607 A * 4/1966 James .................. F04D 29/2227
 416/2
9,714,664 B2 * 7/2017 Ishikawa ............... F04D 29/285
(Continued)

FOREIGN PATENT DOCUMENTS

JP       57-171004      10/1982
JP        4523032       6/2010

*Primary Examiner* — Philip C Tucker
*Assistant Examiner* — Vicki Wu
(74) *Attorney, Agent, or Firm* — Rankin, Hill & Clark LLP (57) ABSTRACT

Provided is a method for manufacturing an impeller composed of a frustum-shaped hub (11) and a plurality of blades provided on a peripheral surface (12) of the hub (11) at predetermined intervals in a circumferential direction and inclined in one direction. The method for manufacturing the impeller comprises: an injection-molding step of injection-molding a molding article (10a) in which the blades are connected to the periphery of the hub (11) via fragile connection parts (16) so as to spread outward; a blade rotationally moving step of rotationally moving the blades (13) to the peripheral surface (12) of the hub (11) about the connection parts (16); and a fixation step of fixing ends of the blades (13) to the hub (11).

2 Claims, 12 Drawing Sheets

(58) Field of Classification Search
CPC .. F04D 29/30; B29L 2031/08; F05D 2230/20; F05D 2230/51
USPC ........................................................ 156/245
See application file for complete search history.

(56) References Cited

U.S. PATENT DOCUMENTS

| | | | |
|---|---|---|---|
| 2009/0252609 A1 | 10/2009 | Kubota | |
| 2015/0204342 A1* | 7/2015 | Liang | F04D 29/181 416/223 R |
| 2016/0341210 A1* | 11/2016 | Ishikawa | F04D 29/2227 |

* cited by examiner

FIG. 12    PRIOR ART

METHOD FOR MANUFACTURING IMPELLER

TECHNICAL FIELD

The present invention relates to a method of manufacturing an impeller used in a compressor or a vehicular air conditioner.

BACKGROUND ART

An impeller used for a vehicular air conditioner or the like generally has a substantially truncated cone-shaped hub which expands in diameter toward one side in the axial direction, and a plurality of vanes provided on the outer circumferential surface of the hub at a predetermined interval in the circumferential direction and inclined in one direction. A manufacturing method of such an impeller having a hub with a plurality of vanes is known (for example, Patent Document 1).

Figure 11:
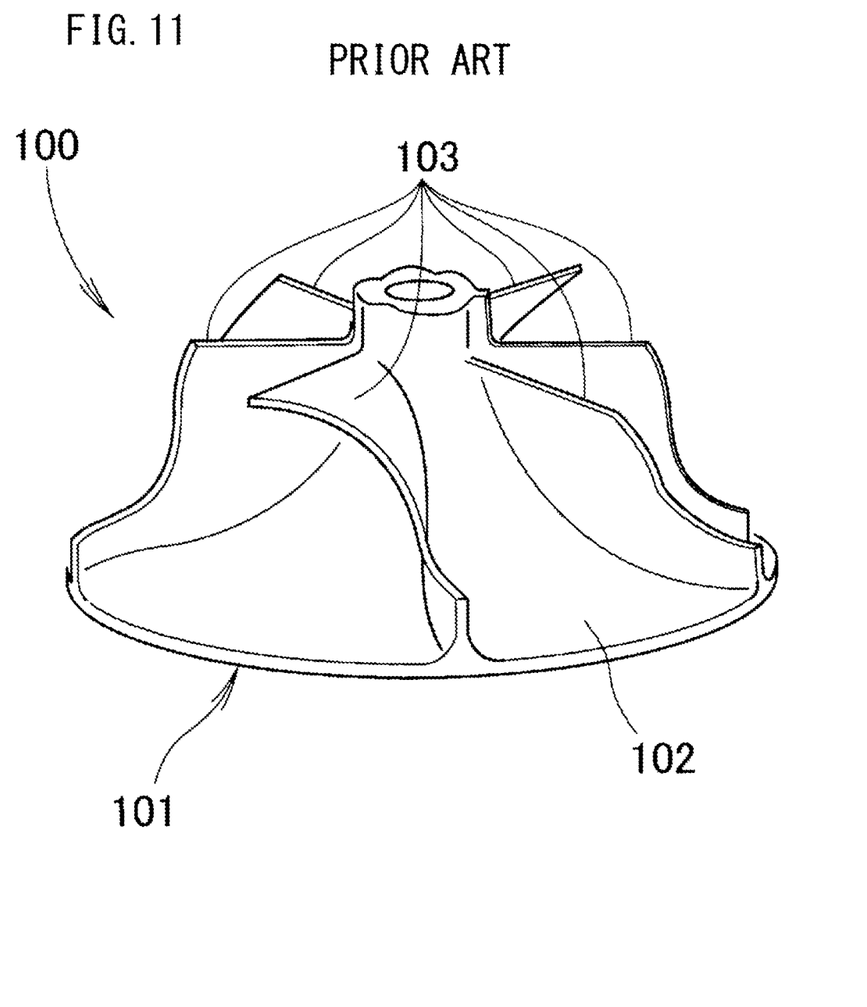
FIG. 11 is a perspective view of an impeller according to a conventional art.

In Patent Document 1, as shown in FIG. 11, an impeller 100 has a substantially truncated cone-shaped hub 101 which expands in diameter toward one side in the axial direction and six vanes 103 provided in on an outer circumferential surface 102 of the hub 101 at a predetermined interval in a circumferential direction and inclined in one direction.

The impeller 100 is made of an aluminum alloy and is manufactured by a die-casting method. The hub 101 and the vanes 103 are formed integrally with each other within a possible shape range by the die-casting method, and then vane positions are corrected by lifting the vanes 103 in a required range of the vanes 103.

Each of the vanes 103 has a shape that is inclined toward the adjacent one of the vanes 103. In order to improve the performance of the impeller 100, it is desirable to increase the number of the vanes 103 and to change the angle of the vanes 103 with respect to the outer circumferential surface 102. However, it is difficult to apply the manufacturing method of the impeller of Patent Document 1 to a resin impeller. In this regard, a manufacturing method of an impeller using a slide die is known (for example, Patent Document 2).

Figure 12:
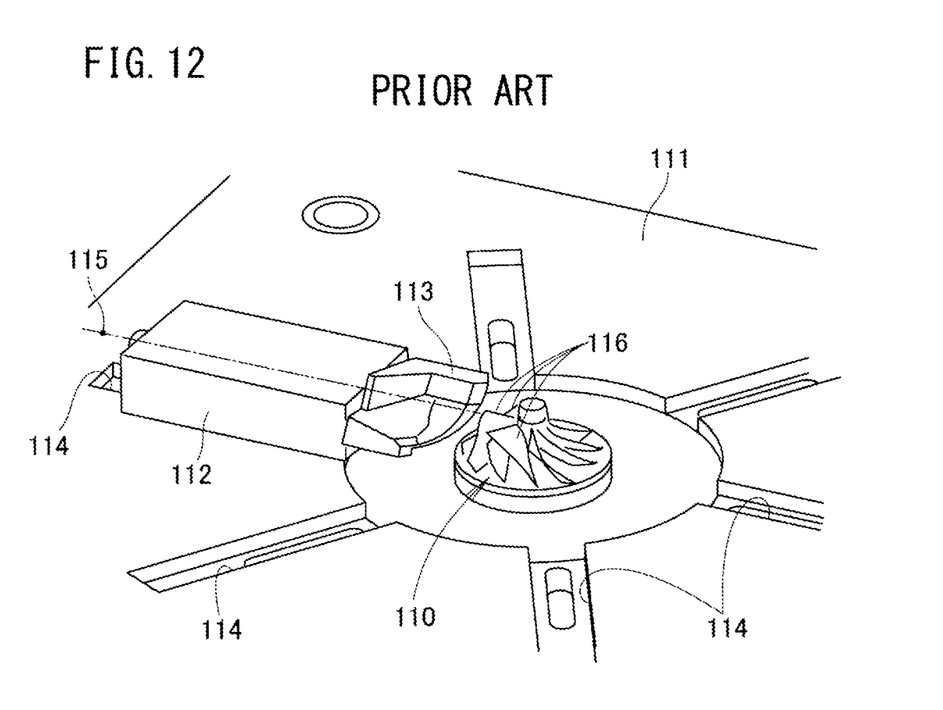
FIG. 12 is an explanatory view showing a manufacturing method of an impeller according to a conventional art.

In Patent Document 2, as shown in FIG. 12, the mold includes a movable die and a fixed die 111 capable of opening/closing in the axial direction of the impeller 110, a slide support portion 112 movable in a direction perpendicular to the axial direction of the impeller 111, and a slide die 113 supported by the slide support portion 112. Grooves 114 radially formed in the fixed die 111 guides the slide support portion 112.

The slide die 113 is provided on the slide support portion 112 rotatably around a rotation axis 115 along a slide direction. Therefore, when the slide support portion 112 retracts after forming the impeller 111, the slide die 113 is rotated and demolded along the shape of the vanes 116 of the impeller 111. Compared to the technique of Patent Document 1, in the technique of Patent Document 2, the number of vanes of the impeller is increased.

However, the increase in the number of the vanes is limited in the technique of Patent Document 2, considering the space for the slide die 113. In addition, because the range in which the slide die 113 can rotate with respect to the slide support portion 112 is limited, it is not possible to change the angle of the vanes 103 with respect to the outer circumferential surface of the hub to achieve a desired shape. For these reasons, it is difficult to obtain a higher performance impeller with further increased number of vanes in a desired shape.

In addition, the slide die 113 is provided on the fixed die 111, making the mold large. Further, the slide die 113 is rotatably supported by the slide support portion 112, making the mold complicated. Therefore, there is a demand for a manufacturing method of an impeller with further increased number of vanes in a desired shape, using a mold with a small-sized and simple structure.

PRIOR ART DOCUMENT

Patent Document

Patent Document 1: Japanese Laid-Open Patent Publication No. 57-171004
Patent Document 2: Japanese Patent No. 4523032

SUMMARY OF INVENTION

Technical Problem

An object of the present invention is to provide a manufacturing method of an impeller with further increased number of vanes in a desired shape, using a mold with a small-sized and simple structure.

Solution to Problem

According to the present invention, there is provided a manufacturing method of an impeller comprising a truncated cone-shaped hub and a plurality of vanes provided on an outer circumferential surface of the hub at a predetermined interval in a circumferential direction and inclined in one direction, the method comprising: an injection molding step of injection-molding a molded article in a state where the vanes are connected to the outer circumferential surface of the hub through weakened connecting parts so as to spread outward; a vane rotational displacement step of rotationally displacing the vanes toward the outer circumferential surface of the hub around the connecting part, and a fixing step of fixing ends of the vanes to the hubs.

Preferably, the impeller has such a shape that the vanes adjacent to each other in the axial direction mutually overlap each other.

Advantageous Effects of Invention

In the present invention, there is provided an injection molding step of injection-molding a molded article in a state where the vanes are connected to the outer circumferential surface of the hub through weakened connection parts so as to spread outward. Since the molded article has the vanes connected to the outer circumferential surface of the hub through the weakened connection portion so as to spread outward, the shape is simple without an undercut portion in injection molding. Therefore, the slide die is not required, and the hub and the vanes can be integrally molded by the fixed die and the movable die. As a result, a mold with a small and simple structure is usable. In addition, since there is no need to take the slide die into consideration, the space in the mold can be effectively utilized, making it possible to increase the number of vanes and form a large number of impellers at the same time.

Further, there are provided a vane rotational displacement step of rotationally displacing the vanes toward the outer circumferential surface of the hub around the connecting part, and a fixing step of fixing ends of the vanes to the hub. Since the vanes are rotationally displaced and fixed to the outer circumferential surface of the hub after injection molding, the shape of the vanes and the angle of the vanes with respect to the outer circumferential surface can be made freely. As a result, an impeller having a desired shape can be obtained.

Further, in the present invention, the impeller has a shape in which the vanes adjacent to each other in the axial direction mutually overlap. According to the present invention, in order to improve the performance of the impeller, even if the shape of the impeller is made complicated, it is possible to obtain an impeller having a desired shape easily and inexpensively by using a mold having a simple structure.

DESCRIPTION OF EMBODIMENTS

First, an embodiment of the present invention will be described below with reference to the accompanying drawings.

Figure 1:
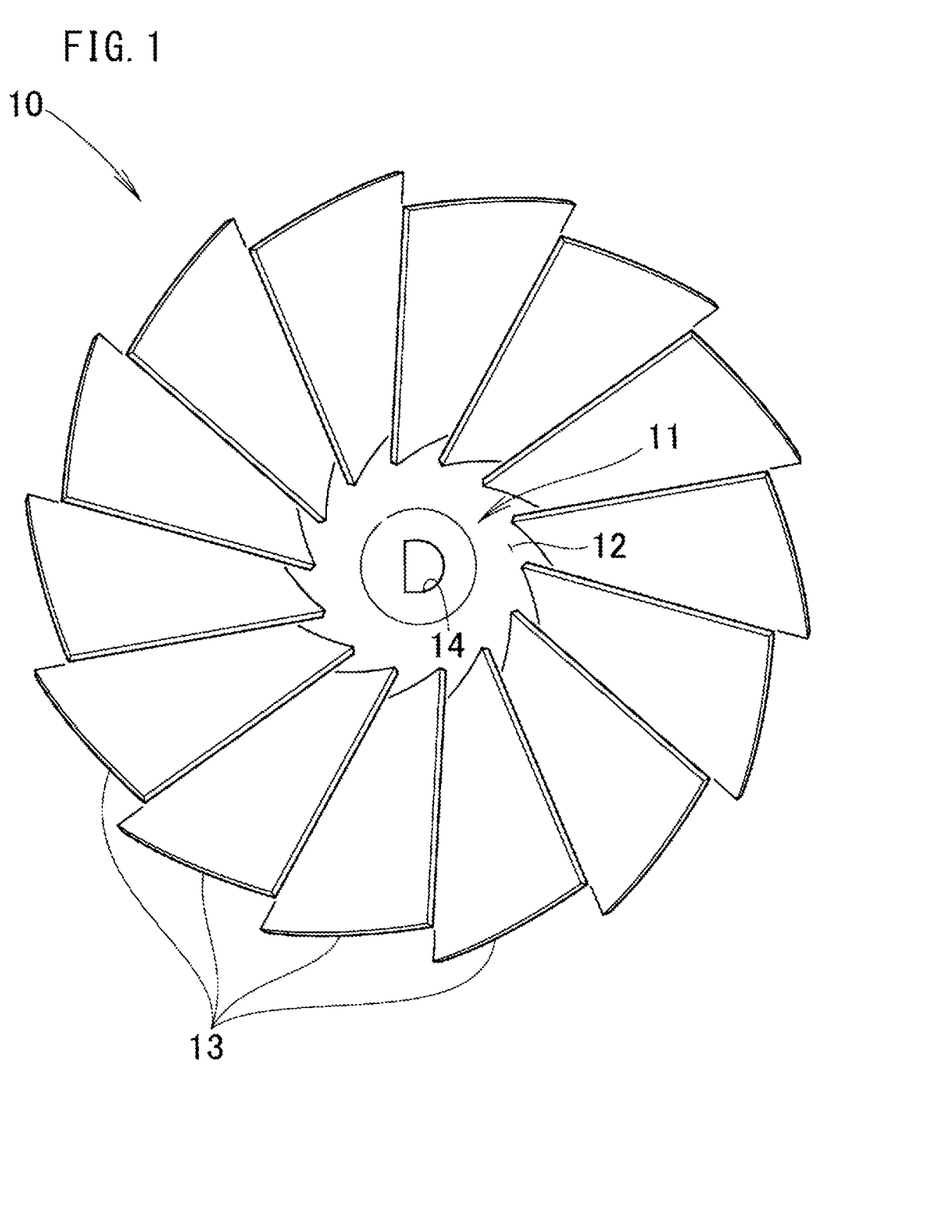
FIG. 1 is a plan view of an impeller according to the present invention.
Figure 2:
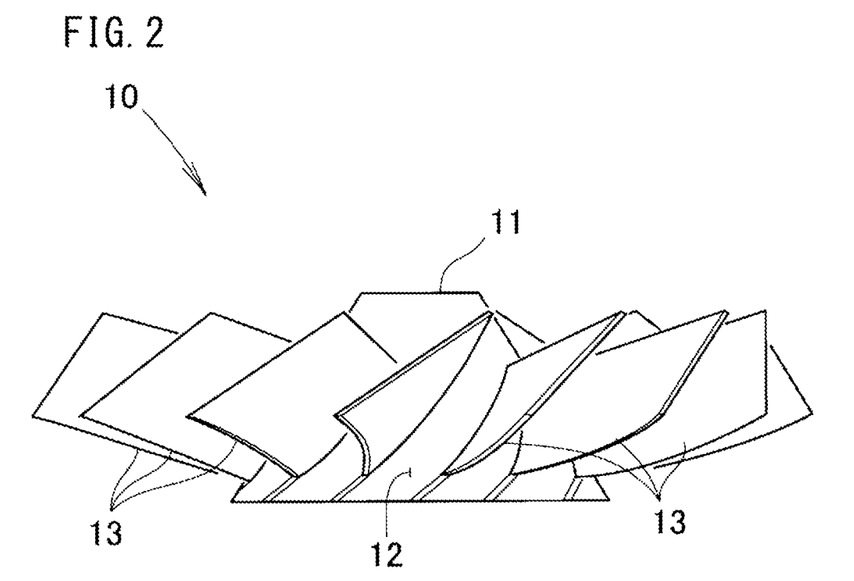
FIG. 2 is a side view of the impeller.

As shown in FIGS. 1 and 2, an impeller 10 is made of resin and formed of a truncated cone-shaped hub 11, a plurality of vanes 13 provided on the outer circumferential surface 12 of the hub 11 at a predetermined interval in the circumferential direction, and a mounting hole 14 through which a rotational shaft extending from a driving source passes. The plurality of vanes 13 are provided on the outer circumferential surface 12 so as to be inclined in one circumferential direction. Further, the impeller 10 has a shape in which the adjacent vanes 13 overlap each other in the axial direction.

By setting the number of the vanes 13 to fourteen (14) as being greater than the number of vanes of the impeller of the prior art and by arranging the adjacent vanes 13 so as to overlap each other in the axial direction, the performance of the impeller 10 can be improved.

In the embodiment, the impeller 10 is a so-called diagonal flow fan in which the number of the vanes 13 is 14, but the present invention is not limited thereto. The number of the vanes 13 may be plural, such as 12, 16, etc. In addition, the adjacent vanes 13 may be shaped so as not to overlap each other in the axial direction. Further, the impeller 10 may be of a centrifugal type and may be a so-called sirocco fan with the vanes 13 facing forward or a so-called turbofan with the vanes 13 facing rearward. In addition, the outer circumferential surface 12 of the hub 11 may be slightly expanded outwardly or recessed inward as long as the hub 11 is substantially truncated cone-shaped.

Next, the molded article obtained by injection molding will be explained.

Figure 3:
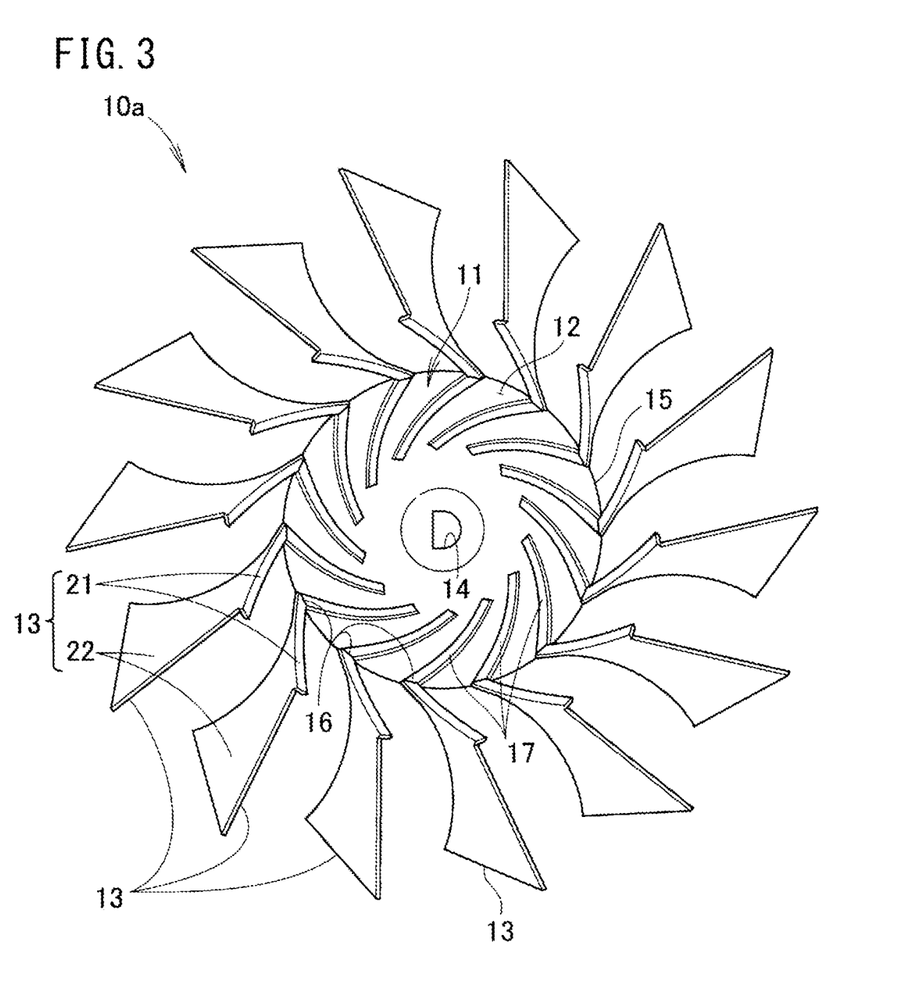
FIG. 3 is a plan view of a molded article obtained by injection molding.

As shown in FIG. 3, the molded article 10a has the truncated cone-shaped hub 11, connecting parts 16 provided on an outer circumferential edge 15 of the hub 11, and the vanes 13 connected to the connecting parts 16 so as to spread outward. On the outer circumferential surface 12 of the hub 11, a joining groove 17 is formed so as to extend obliquely upward from the connecting parts 16.

The vane 13 includes a bone 21 that is formed into a rod shape provided swingably on the connecting part 16, and a blade body 22 extending outward from the bone 21. The bone 21 has a shape that fits into the joining groove 17. The blade body 22 is slightly bent and presents an ideal shape for improving the performance of the impeller 10 when the bone 21 is fixed to the joining groove 17 to form the impeller 10 (see FIG. 2). In the molded article 10a, the adjacent vanes 13 do not overlap each other in the axial direction (in plan view).

The shape of the blade body 22 is not limited to the embodiment, and may be appropriately changed in consideration of the performance of the entire impeller 10. Further, the shape and position of the joining groove 17 are not limited to the embodiment, and may be suitably changed in consideration of the performance of the entire impeller 10.

Next, the mold and the injection molding process will be described.

Figure 4:
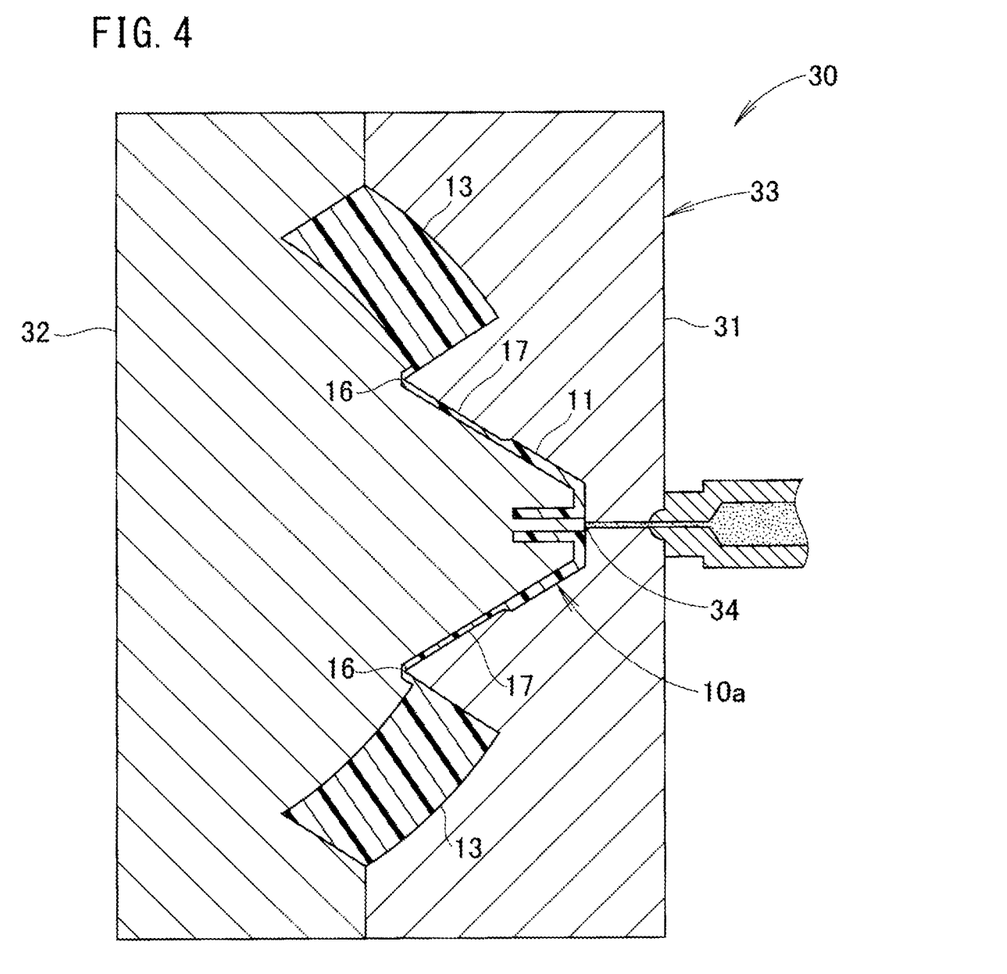
FIG. 4 is a cross-sectional view of a mold.

As shown in FIG. 4, the injection molding machine 30 has a mold 33 composed of a fixed die 31 and a movable die 32. A cavity formed by the fixed die 31 and the movable die 32 is filled with resin from the gate 34, whereby the molded article 10a is formed (injection molding step).

Since the adjacent vanes 13 of the molded article 10a do not overlap in the axial direction, there is no undercut portion in injection molding. Therefore, the mold 33 does not need a slide die. The hub 11 and the vanes 13 can be formed integrally only with the fixed die 31 and the movable die 32. As a result, it is possible to form the mold 33 having a compact and simple structure. In addition, since there is no need to take the slide die into consideration, it is possible to utilize the space in the mold 33 effectively, to increase the number of the vanes 13 and to form a large number of molded articles 10a at one time.

Next, the vane rotational displacement step will be described.

Figure 5A:
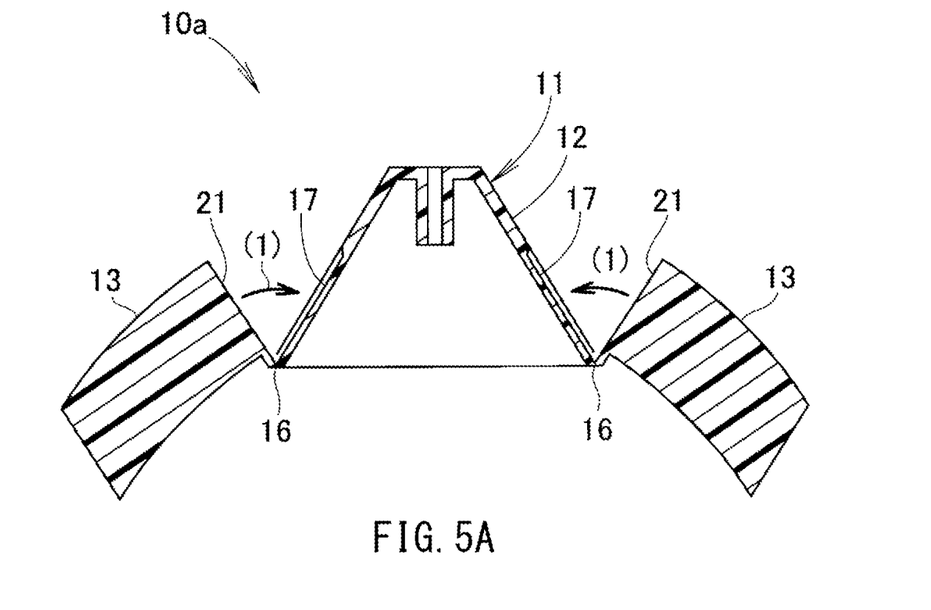
FIG. 5 is a cross-sectional view of the molded article.

As shown in FIG. 5(a), the molded article 10a is in a state in which the vanes 13 are away from the outer circumferential surface 12 of the hub 11. The vanes 13 are rotationally displaced around the connecting part 16 as shown by the arrow (1) (vane rotational displacement step).

Figure 5B:
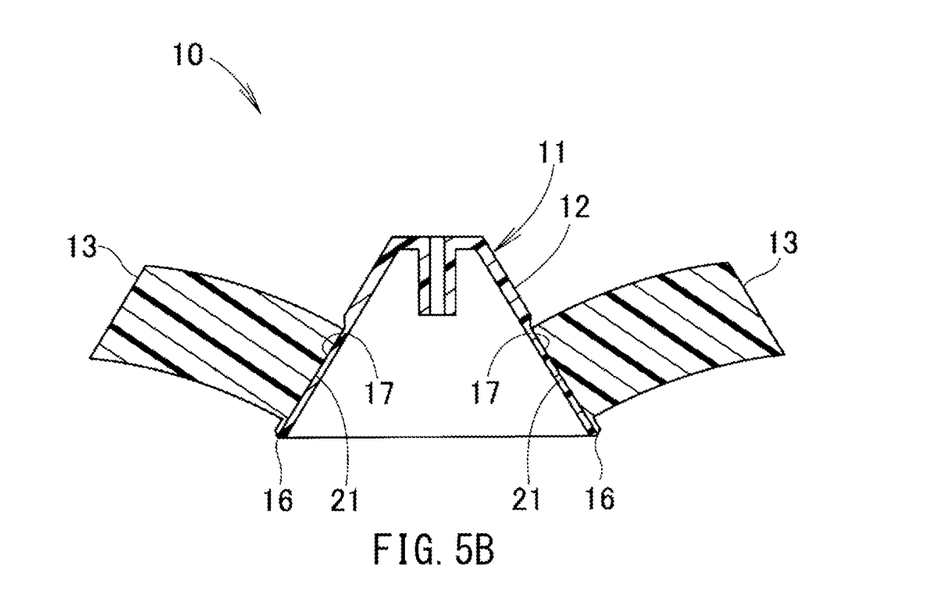

As shown in FIG. 5(b), by fitting the bones 21 into the joining grooves 17, the vanes 13 are in a state of extending outward from the outer circumferential surface 12 of the hub 11. As a result, the impeller 10 can be obtained from the molded article 10a. The joining of the bone 21 to the joining groove 17 will be described later.

Next, the connecting part 16 will be described in detail.

Figure 6:
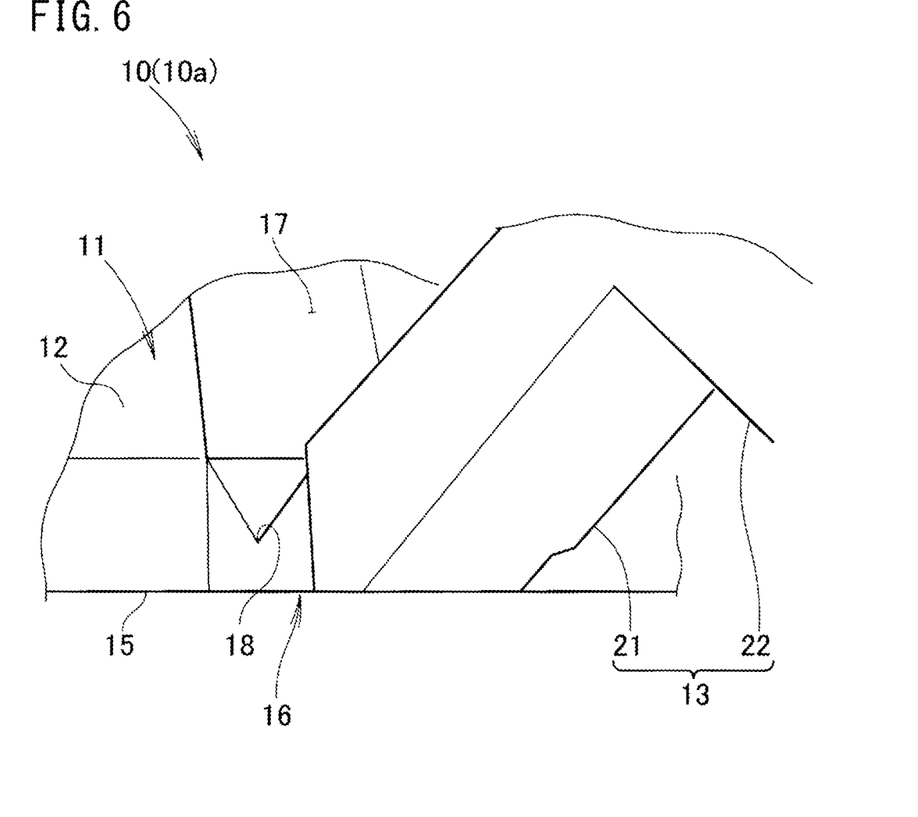
FIG. 6 is a perspective view of a connecting part.

As shown in FIG. 6, the connecting part 16 is provided on the outer circumferential edge 15 of the hub 11, and the bone 21 is connected to the connecting part 16. In the connecting part 16, a V-shaped weakened portion 18 is formed between the outer circumferential edge 15 and the bone 21. By forming the weakened portion 18 in a V-shape, the width in the axial direction (vertical direction in the drawing) is narrowed, the connecting part 16 can be weakened, and the connecting part 16 can have the function of a hinge. As a result, the vanes 13 can be rotationally displaced relative to the hub 11.

Although the weakened portion 18 is formed in a V-shape in the embodiment, it is not limited thereto, and it may be in a U-shape. A V-shaped or U-shaped recess may be formed on the upper and lower sides of the connecting part 16. Further, as long as the vanes 13 can be rotationally displaced with respect to the hub 11, the weakened portion 18 may be in a state similar to a point connection.

Next, the fixing process and the operation of the impeller 10 will be described.

Figure 7:
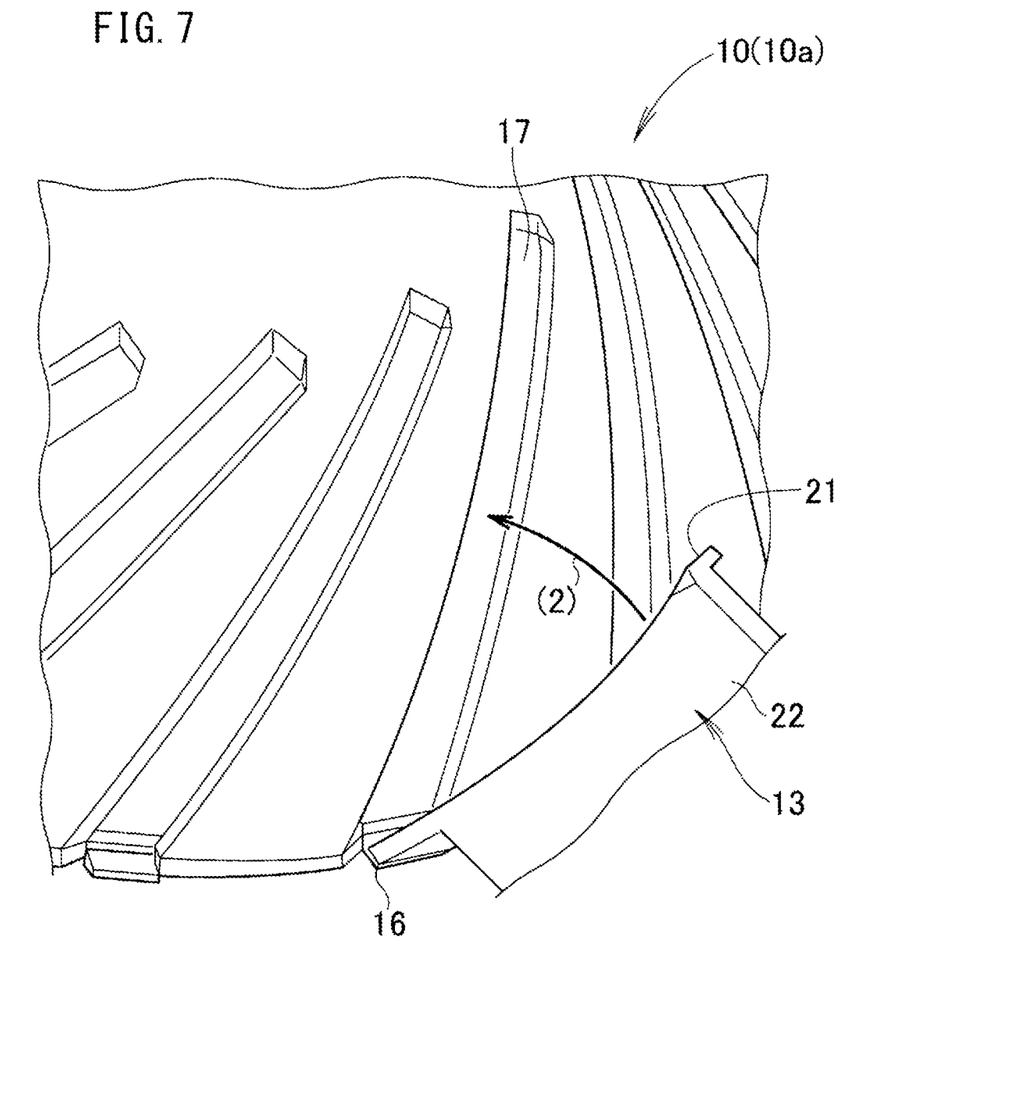
FIG. 7 is a view showing an action on the impeller.

As shown in FIG. 7, an adhesive is applied to the joining groove 17. The vane 13 are rotationally displaced around the connecting part 16 as shown by the arrow (2), and the bone 21 is fitted into the joining groove 17, thereby bonding the bone 21 to the joining groove 17. As a result, the vanes 13 are fixed to the hub, and the impeller 10 is obtained from the molded article 10a (fixing process). The adhesive may be a hot-melt adhesive used by heating and melting. For convenience, one vane 13 is shown, but there are a plurality of vanes 13.

Since the vanes 13 of the molded article 10a are rotationally displaced and fixed to the outer circumferential surface 12 of the hub 11 after injection molding, the shape of the vanes 13 and the angle of the vanes relative to the outer circumferential surface 12 (so-called blade winding angle) can be freely set. As a result, the impeller 10 with a desired shape can be obtained.

Even if the shape of the impeller 10 is made such that the vanes 13 adjacent to each other in the axial direction mutually overlap and the shape of the impeller 10 is made complicated in order to improve the performance of the impeller 10, the mold 33 having a simple structure (see FIG. 4) can be used for obtaining the impeller 10 having a desired shape easily and inexpensively.

Next, another embodiment of the impeller 10 will be described. The same reference numerals are given to the same components as those shown in FIG. 3, and a detailed description thereof will be omitted.

Figure 8:
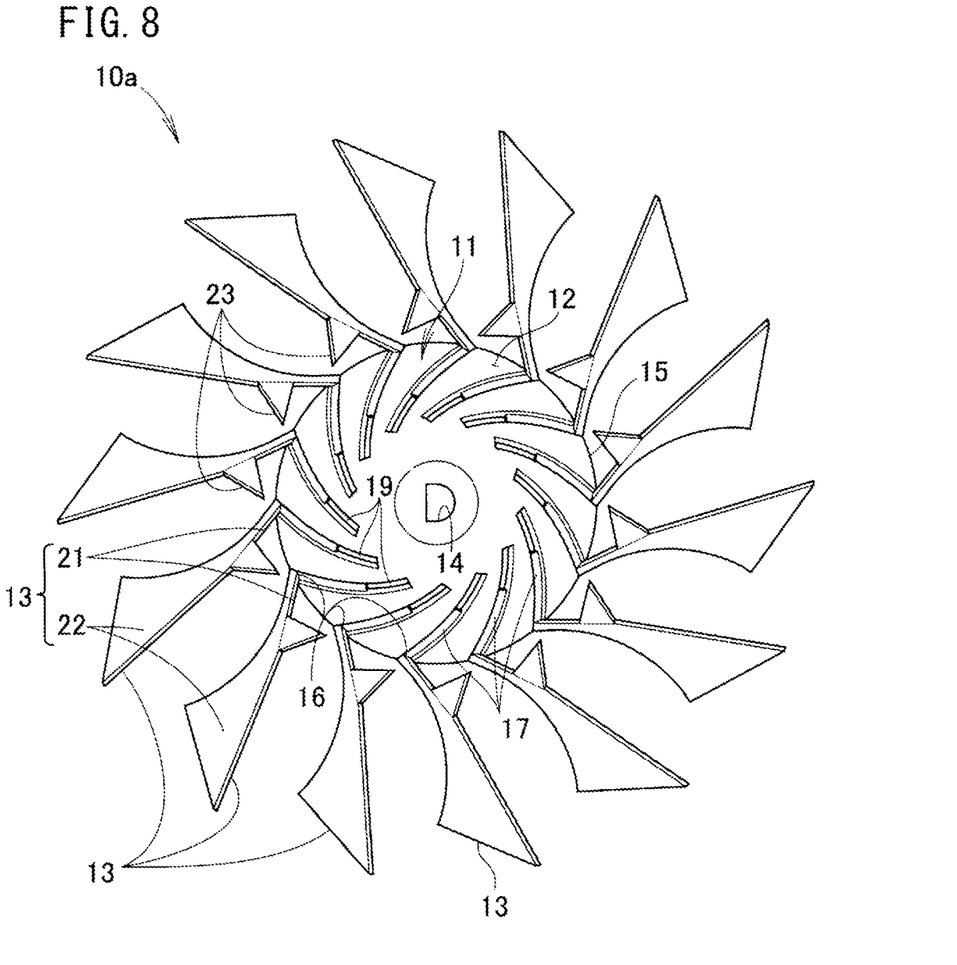
FIG. 8 is a plan view of an impeller according to another embodiment.
Figure 9:
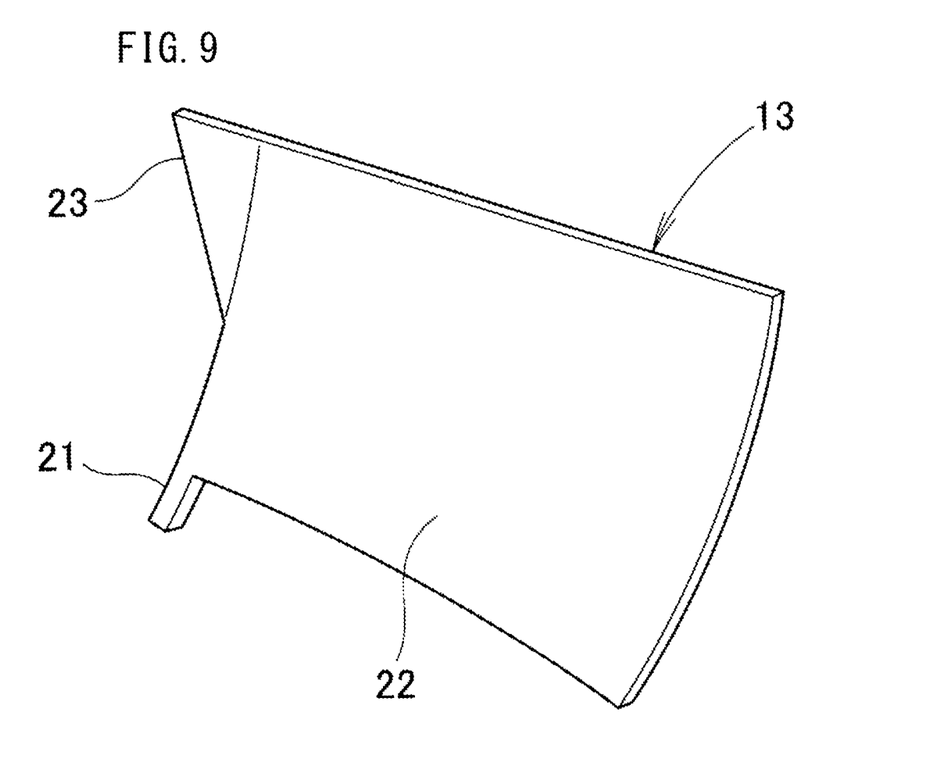
FIG. 9 is a perspective view of a vane of the impeller according to the other embodiment.

As shown in FIGS. 8 and 9, in the joining grooves 17 of the molded article 10a, joining holes 19 for joining the vanes 13 to the hub 11 are formed. In the bone 21 of the vane 13, a projecting portion 23 is formed for insertion into the joining hole 19.

Next, a method of joining the vanes 13 in the impeller 10 of another embodiment will be described.

Figure 10:
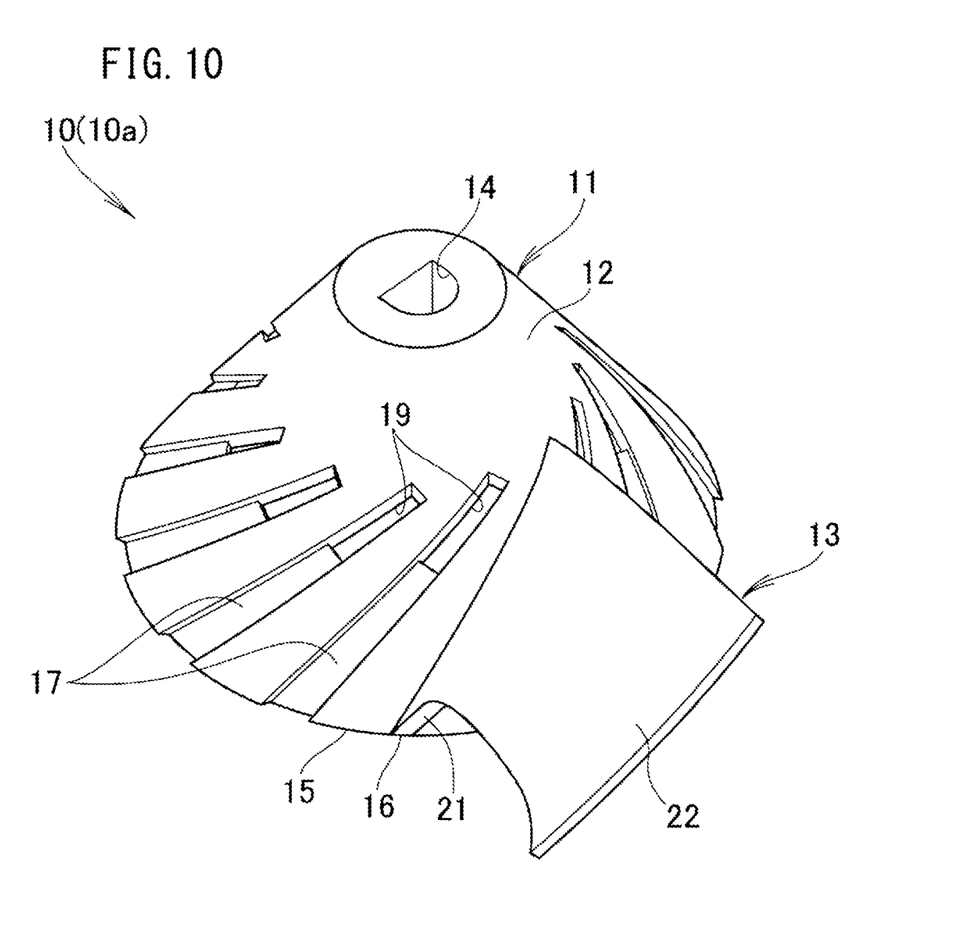
FIG. 10 is a perspective view of a hub of the impeller according to the other embodiment.

As shown in FIGS. 9 and 10, the vane 13 is rotationally displaced around the connecting part 16, and the projecting portion 23 of the vane 13 is inserted into the joining hole 19. For convenience, only one vane 13 is shown, but there are a plurality of vanes 13. It is assumed that the projecting portions 23 of all the vanes 13 are inserted through the joining holes 19.

A caulking member (not shown) is prepared. The abutting surface of the caulking member is formed in a shape along the inner circumferential surface of the hub 11. The caulking member is moved to the inner circumferential surface of the hub 11 so that the abutting surface abuts against the projecting portion 23.

In this way, the caulking member caulks one projecting portion 23. By repeating this by the number of vanes 13, the vanes 13 are fixed to the hub 11. In this manner, the plurality of projecting portions 23 can be caulked by a general caulking method.

When joining by caulking, the projecting portion 23 may be heated for heat caulking.

Although the impeller manufacturing method of the present invention is applied to the impeller for a vehicular air conditioner in the embodiment, the impeller is not limited thereto and may be applicable to an impeller used in a general blower. The method of joining the vanes 13 to the joining grooves 17 is not limited to joining with an adhesive or joining by caulking, but the joining grooves 17 and the bones 21 may be joined in a connector shape. That is, there is no limitation on the joining method as long as the vane 13 can be fixed to the joining groove 17.

INDUSTRIAL APPLICABILITY

The manufacturing method of the impeller of the present invention is suitable for an impeller for a vehicular air conditioner.

REFERENCE SIGNS LIST

10 . . . impeller, 10a . . . molded article, 11 . . . hub, 12 . . . outer circumferential surface of hub, 13 . . . vane, 16 . . . connecting part, 33 . . . mold

The invention claimed is:

1. A manufacturing method of an impeller comprising a truncated cone-shaped hub and a plurality of vanes provided on an outer circumferential surface of the hub at a predetermined interval in a circumferential direction and inclined in one direction, the method comprising:
    an injection molding step of injection-molding a molded article in a state where the vanes are connected to the outer circumferential surface of the hub through weakened connecting parts so as to spread outward;
    a vane rotational displacement step of rotationally displacing the vanes toward the outer circumferential surface of the hub around the connecting parts, and
    a fixing step of fixing ends of the vanes to the hub.

2. The manufacturing method of the impeller according to claim 1, wherein the impeller has a shape, among the plurality of vanes, in which vanes adjacent to each other in the axial direction mutually overlap.

* * * * *